(12) United States Patent
Henry

(10) Patent No.: US 8,212,795 B2
(45) Date of Patent: Jul. 3, 2012

(54) PAYMENT TERMINAL STYLUS WITH TOUCH SCREEN CONTACT DETECTION

(75) Inventor: Chris Henry, Scottsdale, AZ (US)

(73) Assignee: Hypercom Corporation, Scottsdale, AZ (US)

( * ) Notice: Subject to any disclaimer, the term of this patent is extended or adjusted under 35 U.S.C. 154(b) by 723 days.

(21) Appl. No.: 12/277,990

(22) Filed: Nov. 25, 2008

(65) Prior Publication Data

US 2009/0289922 A1 Nov. 26, 2009

Related U.S. Application Data

(60) Provisional application No. 61/055,077, filed on May 21, 2008.

(51) Int. Cl.
*G06F 3/033* (2006.01)
(52) U.S. Cl. .................................... 345/179; 178/19.03
(58) Field of Classification Search .................. None
See application file for complete search history.

(56) References Cited

U.S. PATENT DOCUMENTS

| | | | | |
|---|---|---|---|---|
| 4,158,747 A * | 6/1979 | Muller et al. | ............... | 178/19.03 |
| 4,492,819 A | 1/1985 | Rodgers et al. | | |
| 4,672,154 A * | 6/1987 | Rodgers et al. | ............ | 178/19.07 |
| 4,695,680 A | 9/1987 | Kable | | |
| 5,438,275 A * | 8/1995 | Fado et al. | ..................... | 324/662 |
| 5,571,997 A * | 11/1996 | Gray et al. | ................. | 178/19.04 |
| 5,914,708 A * | 6/1999 | LaGrange et al. | ............ | 345/179 |
| 7,136,052 B1 | 11/2006 | Lam | | |
| 2002/0070927 A1 | 6/2002 | Fujitsuka et al. | | |
| 2004/0144575 A1* | 7/2004 | Zloter et al. | ............... | 178/19.02 |
| 2007/0195068 A1* | 8/2007 | Kable et al. | .................... | 345/179 |
| 2009/0256824 A1* | 10/2009 | Hainzl et al. | .................. | 345/179 |

FOREIGN PATENT DOCUMENTS

| | | |
|---|---|---|
| EP | 0476276 | 3/1992 |
| JP | 62-280918 | 12/1987 |
| JP | 06-314155 | 11/1994 |
| JP | 7064704 | 3/1995 |
| JP | 10-031543 | 2/1998 |

OTHER PUBLICATIONS

PCT International Search Report and Written Opinion issued Jan. 6, 2010 for International Application No. PCT/US2009/044312.
PCT International Preliminary Report on Patentability issued Nov. 23, 2010 for International Application No. PCT/US2009/044312, 5 pages.
EPO Supplementary Search Report dated Aug. 10, 2011, EP09751275.

* cited by examiner

*Primary Examiner* — Andrew L Sniezek
(74) *Attorney, Agent, or Firm* — Snell & Wilmer, LLP

(57) ABSTRACT

In an exemplary embodiment, a stylus operates with a capacitive touch screen only when the stylus tip is in contact with the touch screen. The stylus is used as a sensor to determine the location where a user is touching the surface of a capacitive touch screen, but is not active until the stylus tip is pressed against the touch screen. In an exemplary embodiment, pressing the stylus tip against the touch screen activates the stylus by creating a physical separation in the circuit and disconnecting the stylus tip from ground. When the stylus tip is no longer grounded, it becomes active and is able to operate with a capacitive touch screen. In an exemplary embodiment, signal attenuation may be performed by diverting the sense signal to ground via a capacitor or other electronic component.

11 Claims, 5 Drawing Sheets

PAYMENT TERMINAL STYLUS WITH TOUCH SCREEN CONTACT DETECTION

CROSS-REFERENCE TO RELATED APPLICATIONS

This application claims priority to and benefit of U.S. Provisional Application No. 61/055,077, filed May 21, 2008, and entitled "PAYMENT TERMINAL STYLUS WITH TOUCH SCREEN CONTACT DETECTION", and hereby incorporated by reference.

FIELD OF INVENTION

The present invention relates, generally, to point of sale ("POS") terminals incorporating touch screens, and more particularly to payment transaction POS terminals with touch screens and a stylus.

BACKGROUND OF THE INVENTION

Point of sale ("POS") terminals enable convenient electronic payment for many products and services. For example, consumers holding cards associated with a charge, credit, debit, or loyalty accounts may pay for a purchase simply by using the card with a POS terminal located at stores, restaurants, and other locations where the products and services are being purchased. During the transaction, as part of the process the customer (card holder) may make payment selections on the terminal, and in addition for credit type transactions, often the customer's signature is required to be captured on paper, or electronically.

Payment terminals often incorporate displays as well as input devices such as keypads and/or touch screens that allow the customer to make inputs to the terminal as necessary to complete the payment transaction.

Where the terminal incorporates or connects to a touch screen (or touch pad or touch panel), that touch screen is often used to electronically capture the signature of the card holder. Resistive and capacitive touch panels are the two most widely used touch screen technologies in POS terminals. Resistive touch panels are essentially pressure sensitive and as such require pressure from a finger or stylus in order for the touch screen to detect its use.

However within capacitive touch panels, the technology works by detecting changes in the emitted near field electromagnetic fields radiated from the touch screen. There are several advantages of capacitive panel technology over resistive panels and others, including not requiring a plastic film cover as generally used with a resistive panel, as the plastic film often scratches. Also a capacitive screen is more secure because it is difficult for an unauthorized person to obtain personal information based on finger or pen location as the signals from the touch screen undergo a high speed multiplexed scanning. However, one of the disadvantages is that a capacitive screen may activate when a stylus or a finger is approaching, or is near to the surface of the touch panel, rather than only when in contact with it. For this problem, solutions already exist comprising a stylus with a switch integrated into the stylus that disables the operation of the stylus until in contact with the glass. One prior art example is illustrated in FIG. 1. This type of stylus 100 typically enables sending a sense signal to the touch controller from stylus 100 when a tip 110 of stylus 100 is in contact with the glass, and pressed down enough to activate a switch 120. The switch 120 is used as a way to detect "pen down" of the stylus. The switch 120 is activated when tip 110 is pressed down enough to create a necessary circuit connection. In other words, a tip plunger 130 must touch switch 120 is create the connection. Therefore, if the pen is not pressed down hard enough, or if there is a problem with creating sufficient electrical contact, the transmitting of the sense signal is still disabled and the stylus will not operate.

The problem with such a stylus with a "pen down" switch is that should the switch no longer work, the likely mode of failure is that contacts will no longer close within the switch and thus the "pen down" sense signal will no longer be detected, causing the stylus to be inoperable. Additionally, switches small enough to fit within such a stylus are typically only of a rated cycle life of 50,000 or 100,000 cycles whereas a stylus can expect something over 2,000,000 usage cycles over a few years of use. A cycle is considered to be pressing a stylus down and picking it up. For example, a person may complete several cycles while signing a signature.

SUMMARY OF THE INVENTION

In accordance with various aspects of the present invention, a method and device for a more operable stylus and touch screen is disclosed. In an exemplary embodiment, a stylus operates with a capacitive touch screen only when the stylus tip is in contact with the touch screen. A stylus may include a housing, a stylus tip capable of interacting with electromagnetic fields, and a circuit to ground the tip.

The stylus is used as a sensor to determine the location where a user is touching the surface of a capacitive touch screen, but is not active until the stylus tip is pressed against the touch screen. In an exemplary embodiment, pressing the stylus tip against the touch screen activates the stylus by creating a physical separation in the circuit and disconnecting the stylus tip from ground. When the stylus tip is no longer grounded, it becomes active and is able to operate with a capacitive touch screen. In an exemplary embodiment, signal attenuation may be performed by diverting the sense signal to ground via a capacitor.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The present invention may be described herein in terms of various functional components and various processing steps. It should be appreciated that such functional components may be realized by any number of hardware or structural components configured to perform the specified functions. For example, the present invention may employ various integrated components, such as transistors, amplifiers, buffers, and logic devices comprised of various electrical devices, e.g., resistors, capacitors, diodes and the like, whose values may be suitably configured for various intended purposes.

Further, it should be noted that while various components may be suitably coupled or connected to other components within exemplary circuits, such connections and couplings can be realized by direct connection between components, or by connection through other components and devices located thereinbetween.

Figure 1:
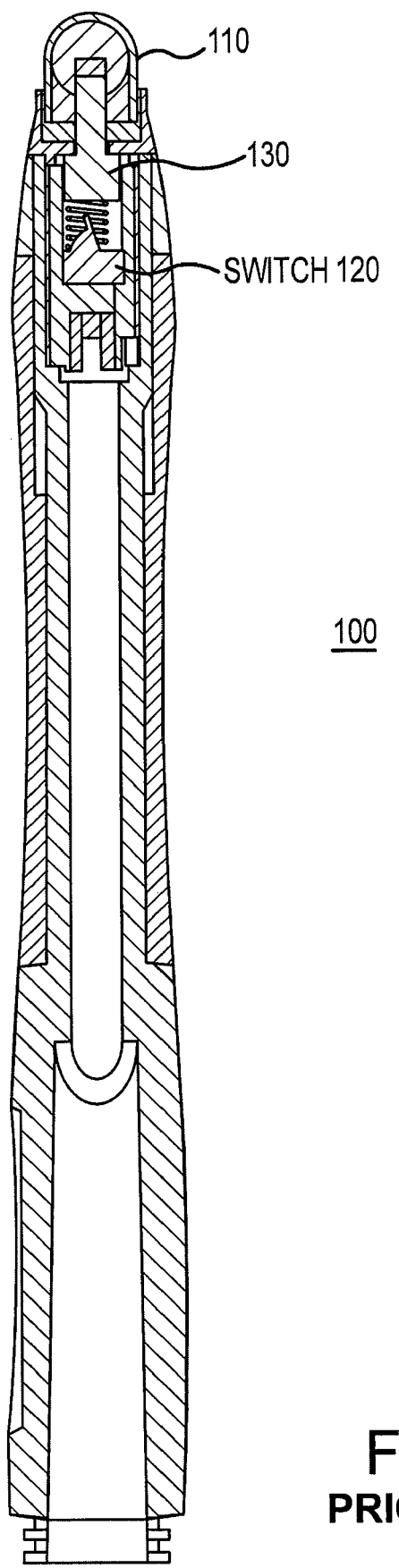
FIG. 1 illustrates a prior art example of a stylus.
Figure 2:
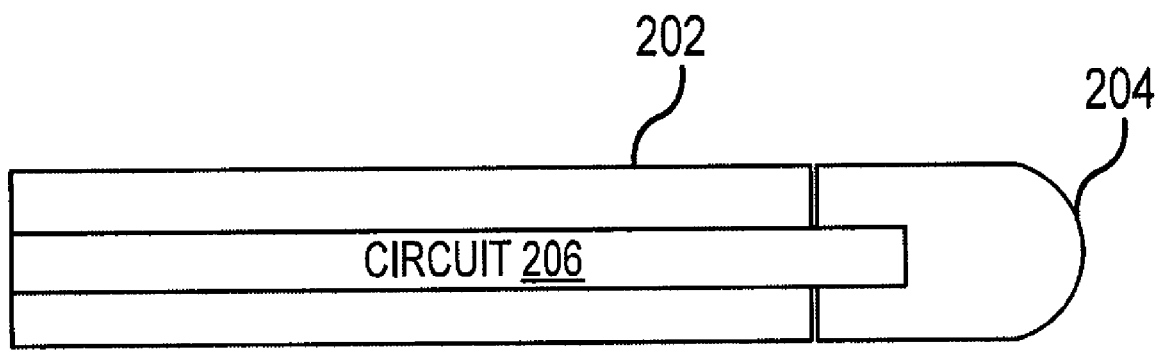
FIG. 2 illustrates an example of an exemplary stylus.

In accordance with an exemplary embodiment and with reference to FIG. 2, a stylus 200 comprises a housing 202, a stylus tip 204 capable of interacting with electromagnetic fields, and a circuit 206 configured to ground stylus tip 204. The stylus is configured to operate with a capacitive touch screen. The touch screen may be, for example, the same or similar to the touch screen incorporated in the Hypercom L4150 POS terminal. Generally, the capacitive touch screen and stylus 200 would be used for completing a commercial transaction. For example, stylus may be used in conjunction with a POS terminal, where a signature capture is needed to complete a transaction, to select from a display menu prompt, or for keypad entry of alphanumeric information.

In accordance with an exemplary embodiment, stylus 200 is not active to operate with a capacitive touch screen until stylus tip 204 is pressed against the touch screen (not shown). In an exemplary embodiment, pressing stylus tip 204 against the touch screen creates a physical separation in circuit 206 and disconnects stylus tip 204 from ground. When stylus tip 204 is no longer grounded, it becomes active and is able to operate with a capacitive touch screen In an exemplary embodiment, stylus tip 204 comprises a metallic core. The metallic core may be, for example, bronze or copper. Moreover, stylus tip 204 may comprise any suitable conductive material able to interact with electromagnetic fields as would be known to one skilled in the art. In another exemplary embodiment, stylus tip 204 has a plastic covering so as to not damage a touch screen when used.

In an exemplary embodiment, circuit 206 comprises a wire connected from stylus tip 204 to a ground connection (not shown). In another embodiment, circuit 206 may further comprise an element with resistance. In one embodiment, the element with resistance is a resistor. The element with resistance aids in attenuating a signal generated by contact of stylus tip 204 with the capacitive touch screen. In another embodiment, signal attenuation may be performed by diverting the signal to the ground connection via a capacitor. Moreover, circuit 206 may comprise various circuit components which ground stylus tip 204 as would be known to one skilled in the art.

Figure 3:
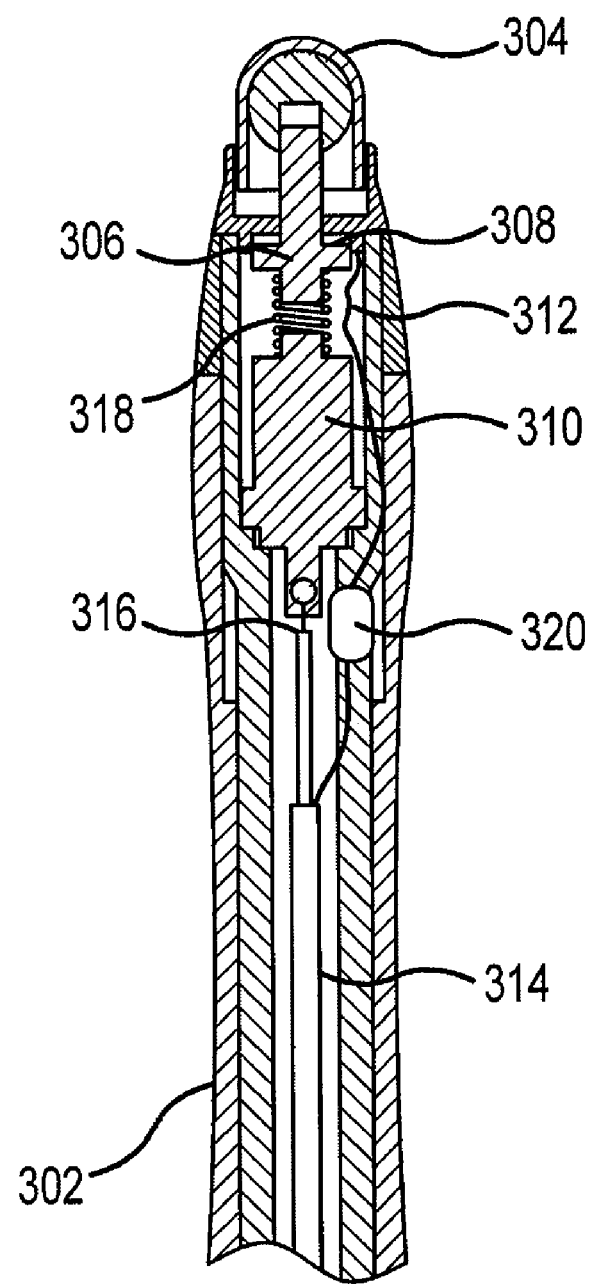
FIG. 3 illustrates another example of an exemplary stylus.
Figure 4:
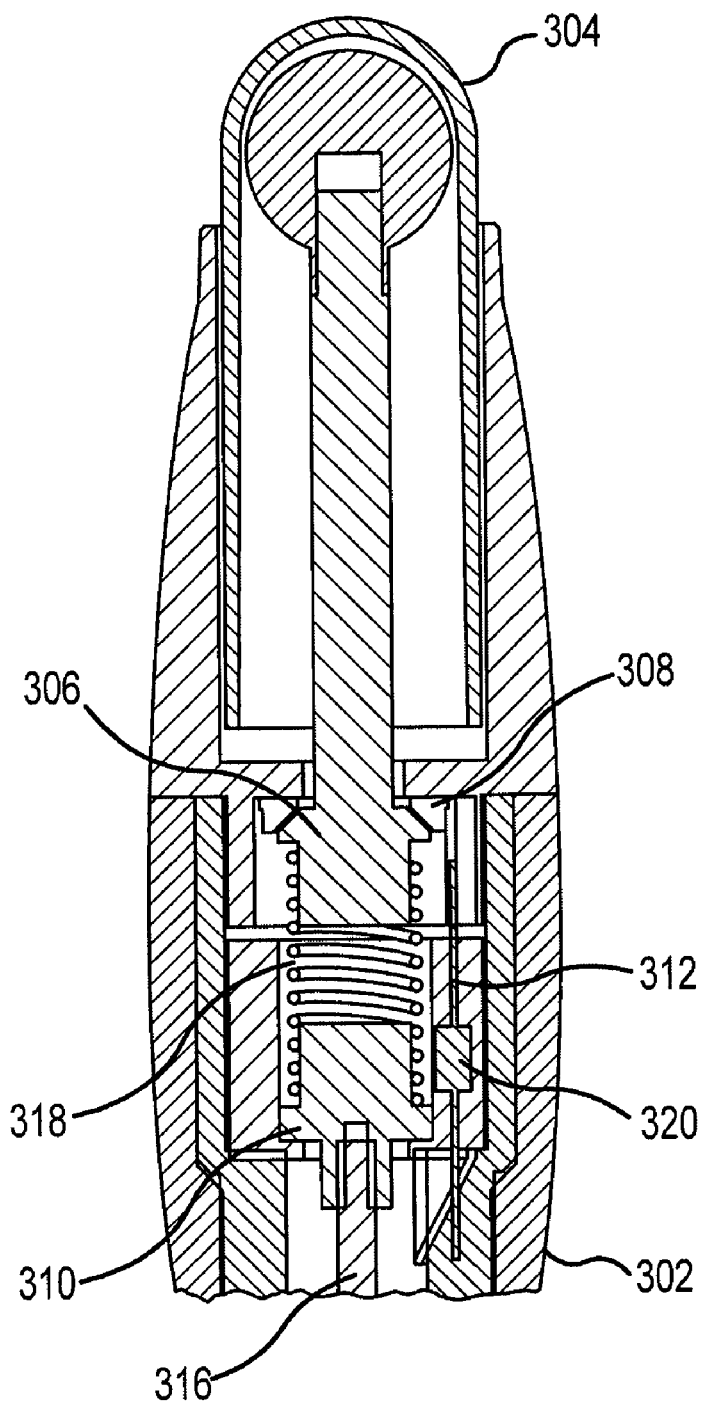
FIG. 4 illustrates a detailed example of an exemplary stylus.

In another exemplary embodiment, and with reference to FIG. 3 and reference to detailed FIG. 4, a stylus 300 comprises a housing 302 that contains a stylus tip 304, a tip plunger 306, a conductive ring 308, a wired contact 310, a cable shield 312, a cable with grounded shield 314, a center conductor 316, and a spring 318. In another exemplary embodiment, stylus may further comprise a resistive component 320. In one embodiment, when stylus 300 is not pressing against a surface, tip plunger 306 is in contact with conductive ring 308. In addition, conductive ring 308 is grounded through cable shield 312. Conductive ring 308 may also be described as a grounding plate.

In another exemplary embodiment, stylus tip 304 is removable from stylus 300. The stylus tip 304 may be unscrewed, pulled-off, or any other method for removing the tip as would be known to one skilled in the art. In an exemplary embodiment, stylus tip 304 is unscrewed without rotating or moving tip plunger 306, having the benefit of not adding stress to tip plunger 306 or other stylus components. One aspect of a removable stylus tip 304 is that stylus tip 304 may be replaced as opposed to replacing an entire stylus when stylus 300 is not operating correctly. Another aspect of a removable stylus tip 304 is that stylus tip 304 may be cleaned in order to increase the operating efficiency of stylus 300. For example, if stylus 300 is not operating correctly, stylus tip 304 may be removed and the electrical contacts cleaned. Often dirt, dust or some other material may interfere with an electrical contact and result in no contact or inefficient contact which interrupts electrical communication of signals in stylus 300.

Furthermore, in another embodiment, stylus tip 304 receives a charge from contact with the capacitive touch screen and generates a sense signal. The sense signal is analog and transmits from stylus 300, via a wire, to a receiver. In an exemplary embodiment, the receiver is configured to detect near field presence and location of stylus 300 on the capacitive touch screen by using both the sense signal from stylus 300 and a sense signal from the touch screen surface. In an exemplary embodiment, the receiver is located at the POS terminal. In another embodiment, the receiver may be on a touch screen controller integrated circuit. Furthermore, in another exemplary embodiment, stylus 300 transmits a sense signal to the receiver using a radio frequency (RF) signal. Moreover, stylus 300 may transmit a sense signal to the receiver through any wireless means as would be known to one skilled in the art.

In accordance with an exemplary embodiment, stylus 300 does not transmit a sense signal to the receiver when stylus tip 304 is grounded by conductive ring 308. By grounding stylus tip 304, the sense signal is diverted to the ground connection and not transmitted to the receiver. In an exemplary embodiment, the sense signal acts as an enabling signal for the receiver. When the sense signal is grounded, the receiver is not enabled to take action based on any charge displacement on the touch screen surface. In accordance with another exemplary embodiment, when the sense signal is grounded, the receiver receives no sense signal and is thus unable to determine the location of stylus tip 304 on the touch screen surface. In an exemplary embodiment, the POS terminal is inoperative when stylus 300 does not transmit the sense signal.

Figure 5:
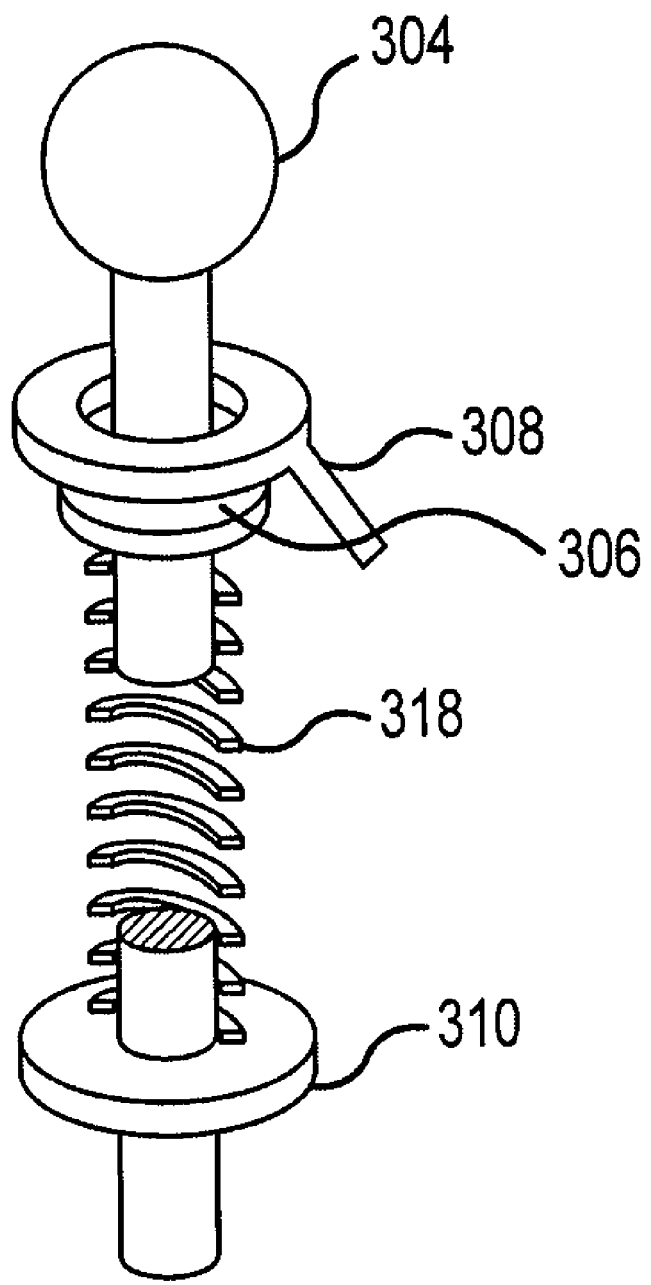
FIG. 5 illustrates a cut-away view of an exemplary stylus tip.

FIG. 5 illustrates a cut-away view of an exemplary embodiment that includes spring 318 between tip plunger 306 and wired contact 310. Spring 318 keeps tip plunger 306 in contact with conductive ring 308 unless stylus tip 304 is physically pressed down, causing spring 318 to compress and separate tip plunger 306 from conductive ring 308. Furthermore, spring 318 reestablishes the grounding contact between tip plunger 306 and conductive ring 308 when stylus tip 304 is lifted off a touch screen. The advantage of this embodiment is that only a small separation of tip plunger 306 and conductive ring 308 is needed for stylus 300 to operate. In an exemplary embodiment, a separation of about 0.3 millimeters or less sufficiently breaks contact and allows stylus 300 to operate.

The present invention has been described above with reference to various exemplary embodiments. However, those skilled in the art will recognize that changes and modifications may be made to the exemplary embodiments without departing from the scope of the present invention. For example, the various exemplary embodiments can be implemented with other types of power supply circuits in addition to the circuits illustrated above. These alternatives can be suitably selected depending upon the particular application or in consideration of any number of factors associated with the operation of the system. Moreover, these and other changes or modifications are intended to be included within the scope of the present invention.

The invention claimed is:

1. A stylus comprising:
   a stylus tip configured to generate a sense signal using an electromagnetic field of a capacitive screen;
   a tip plunger connected to the stylus tip, wherein the tip plunger comprises a grounded state and a conducting state; and
   a conductive ring, connected to ground, comprising a grounded state;
   a cable shield to connect the conductive ring to a ground connection;
   a capacitor in communication with the cable shield;
   wherein the tip plunger is configured to operate in the grounded state if in contact with the conductive ring; and
   wherein the tip plunger is configured to operate in the conducting state in response to separation from the conductive ring, whereby pressure on the stylus tip creates separation of the tip plunger and the conductive ring and facilitates transmission of the sense signal.

2. The stylus of claim 1, further comprising a spring configured to maintain a connection between the tip plunger and the conductive ring, wherein the spring compresses to create separation between the tip plunger and the conductive ring in response to pressure on the stylus tip.

3. The stylus of claim 1, wherein the tip plunger is in contact with the conductive ring if no pressure is applied to the stylus tip.

4. The stylus of claim 1, wherein a separation between the tip plunger and the conductive ring of about 0.3 millimeters or less facilitates transmission of the sense signal.

5. The stylus of claim 1, further comprising a wired connection from the stylus to a receiver.

6. The stylus of claim 1, further comprising a wireless connection between the stylus and a receiver.

7. The stylus of claim 1, wherein the stylus and the capacitive screen are part of a point-of-sale terminal.

8. A method comprising:
   pressing a stylus tip of a stylus against a capacitive screen;
   generating a sense signal from an electromagnetic field of the capacitive screen in response to separation of a tip plunger from a conductive ring, whereby pressure on the stylus tip creates separation of the tip plunger and the conductive ring and facilitates transmission of the sense signal, wherein a cable shield connects the conductive ring to a ground connection, wherein a capacitor is in communication with the cable shield; and
   transmitting the sense signal to a receiver;
   wherein the conductive ring prohibits transmission of the sense signal if in contact with the tip plunger.

9. The method of claim 8, further comprising compressing a spring in the stylus to facilitate separation of the tip plunger from the conductive ring.

10. The method of claim 9, further comprising decompressing the spring to cause contact between the tip plunger and the conductive ring.

11. The method of claim 8, further comprising removing the stylus tip from the capacitive screen to facilitate replacement.

* * * * *